(12) United States Patent
Bolzicco et al.

(10) Patent No.: US 8,935,976 B2
(45) Date of Patent: Jan. 20, 2015

(54) ADAPTER FOR BEVERAGE PREPARATION MACHINES, PARTICULARLY FOR MAKING ESPRESSO COFFEE

(75) Inventors: Claudio Bolzicco, Pordenone (IT); Romano Doc, Trieste (IT)

(73) Assignee: Illycaffe' S.p.A. (IT)

( * ) Notice: Subject to any disclaimer, the term of this patent is extended or adjusted under 35 U.S.C. 154(b) by 418 days.

(21) Appl. No.: 13/028,295

(22) Filed: Feb. 16, 2011

(65) Prior Publication Data

US 2011/0197771 A1 Aug. 18, 2011

(30) Foreign Application Priority Data

Feb. 17, 2010 (IT) .............................. MI2010A0239

(51) Int. Cl.
*A47J 31/40* (2006.01)
*A47J 31/00* (2006.01)
*A47J 31/44* (2006.01)
*A47J 31/06* (2006.01)
*A47J 31/36* (2006.01)

(52) U.S. Cl.
CPC .......... *A47J 31/4467* (2013.01); *A47J 31/0668* (2013.01); *A47J 31/3676* (2013.01); *A47J 31/4471* (2013.01)
USPC .......................................... 99/295; 99/289 R

(58) Field of Classification Search
CPC .............. A47J 31/0668; A47J 31/4471; A47J 31/4467; A47J 31/3676
USPC ................ 99/280, 283, 295, 356, 359, 289 R
See application file for complete search history.

(56) References Cited

U.S. PATENT DOCUMENTS

| | | | | |
|---|---|---|---|---|
| 3,519,319 A | * | 7/1970 | Taylor | 312/246 |
| 4,314,734 A | * | 2/1982 | Grunert | 312/322 |
| 4,441,771 A | * | 4/1984 | Roesler | 312/322 |
| 7,140,703 B1 | * | 11/2006 | Holdgate et al. | 312/323 |
| 7,963,408 B2 | * | 6/2011 | Glover | 211/126.15 |
| 2008/0121111 A1 | * | 5/2008 | Paget et al. | 99/295 |

FOREIGN PATENT DOCUMENTS

| | | |
|---|---|---|
| EP | 0838185 A1 | 4/1998 |
| EP | 1583446 B1 | 5/2006 |
| FR | 2873011 A1 | 1/2006 |

OTHER PUBLICATIONS

Italian Search Report IT MI20100239; Dated Nov. 17, 2010.

* cited by examiner

*Primary Examiner* — Jianying Atkisson
(74) *Attorney, Agent, or Firm* — Cantor Colburn LLP

(57) ABSTRACT

An adapter for machines for preparing beverages, particularly espresso coffee, comprising a supporting element which can be associated with water dispensing means and a cartridge holder associated with the supporting element, the cartridge holder comprising a plurality of receptacles for respective cartridges for infusions or the like and being movable, with respect to the supporting element, from a position for dispensing the infusion to a position for loading and/or unloading the cartridges, the supporting element being further provided with a front opening for moving the cartridge holder from the position for dispensing the infusion to the position for loading and/or unloading the cartridges and vice versa, at least one guide being provided for the translational motion of the cartridge holder with respect to the supporting element between two intermediate positions which are comprised between the loading and/or unloading position and the infusion dispensing position.

21 Claims, 13 Drawing Sheets

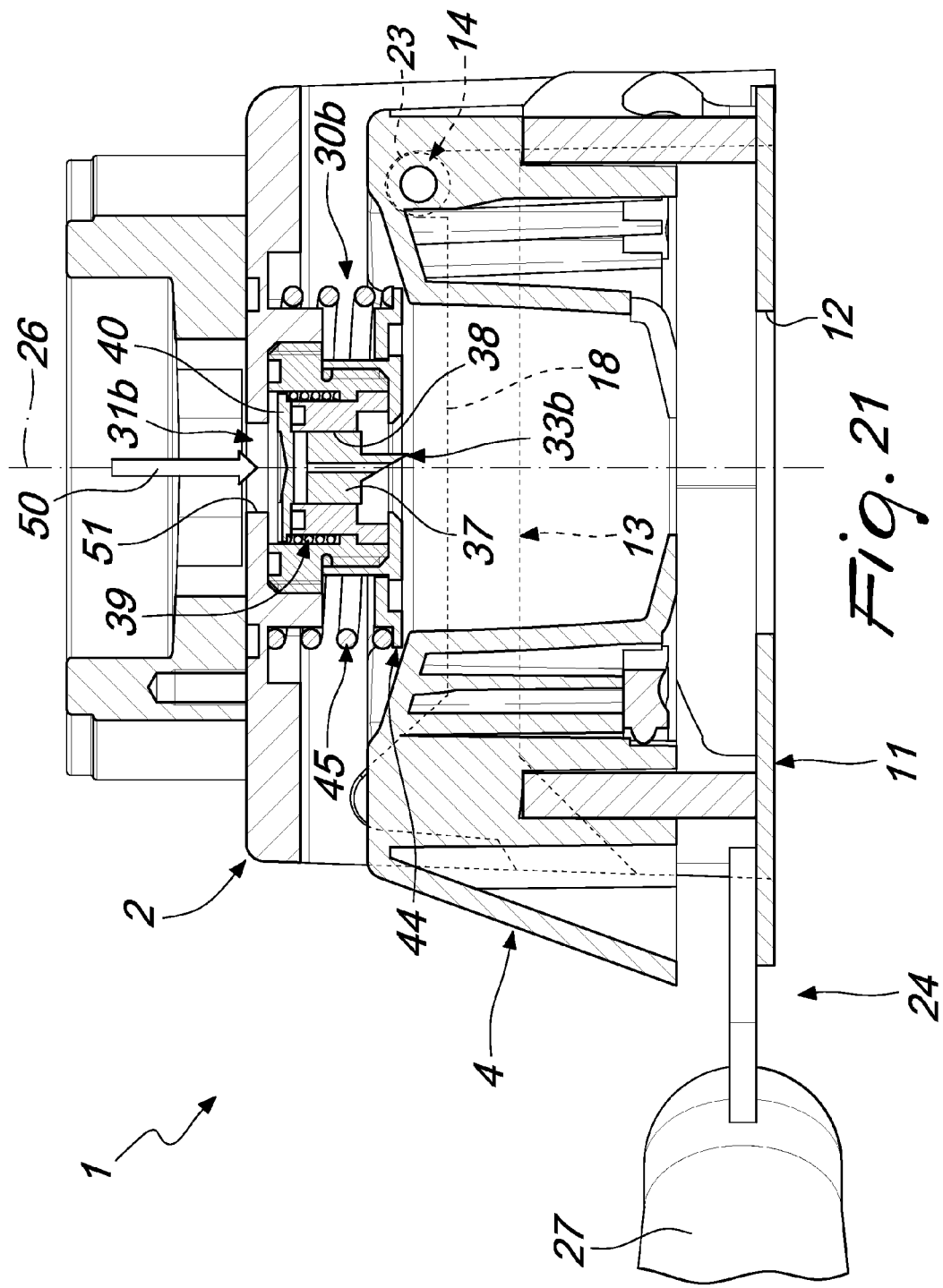

US 8,935,976 B2

ADAPTER FOR BEVERAGE PREPARATION MACHINES, PARTICULARLY FOR MAKING ESPRESSO COFFEE

TECHNICAL FIELD

The present invention relates to an adapter for beverage preparation machines, particularly for preparing espresso coffee.

BACKGROUND

Adapters for machines for preparing beverages such as espresso coffee are known which comprise generically a supporting element, which is adapted to be connected to the beverage preparation machine, and on which a cartridge holder is mounted which is adapted to contain the cartridge or cartridges through which hot water, dispensed by the machine, is filtered under pressure, in order to obtain the beverage or infusion.

From the functional point of view, the cartridge holder is associated with the supporting element in order to allow the operations for loading and/or unloading the cartridges, as well as the arrangement of the cartridge holder in an active position for providing the infusion and in an inactive position to allow the operations for cleaning the adapter.

Aside from the fact of providing one or more cartridges, these conventional adapters are not devoid of drawbacks, which include the fact that the movement of the cartridge holder with respect to the supporting element, in order to perform the functions described previously, is entrusted to complicated kinematic systems that make the adapter structurally complex and expensive as well.

Another drawback of conventional adapters is in the fact that, in order to perform the operations for loading and/or unloading the cartridges and for cleaning, complete extraction of the cartridge holder from the supporting element is not provided.

In fact, this extraction typically can be achieved only by disassembling, where possible and with difficulty on the part of the average user, the cartridge holder from the supporting element.

BRIEF SUMMARY

The aim of the present invention is to provide an adapter for beverage preparation machines, particularly for preparing espresso coffee, that is structurally simple and easy to use on the part of the user for the operations for loading and/or unloading the cartridges, for the operations for providing the infusion, and for performing the operations for cleaning the adapter.

Within this aim, the invention provides an adapter for beverage preparation machines wherein the cartridge holder can be extracted easily in order to perform the operations for cleaning the adapter.

The invention further provides a multi-cartridge adapter for beverage preparation machines that provides for the use of even a single cartridge in order to prepare the infusion.

More particularly, the invention provides an adapter for beverage preparation machines, particularly for preparing espresso coffee, comprising a supporting element which can be associated with water dispensing means and a cartridge holder associated with said supporting element, the cartridge holder comprising a plurality of receptacles for respective cartridges for infusions or the like and being movable with respect to said supporting element from a position for dispensing the infusion to a position for loading and/or unloading said cartridges, the supporting element being provided with a front opening for moving said cartridge holder from said position for dispensing the infusion to said position for loading and/or unloading the cartridges and vice versa, the adapter being characterized in that it comprises at least one guide for the translational motion of the cartridge holder with respect to the supporting element, said at least one guide comprising a first straight portion which is adapted to allow a sliding of the cartridge holder with respect to the supporting element between two intermediate positions comprised between said loading and/or unloading position and said infusion dispensing position, said at least one guide further comprising a second portion that branches off from a first end of said first portion, said first end being adjacent to the front opening of the supporting element, the second portion being inclined with respect to the first portion away from the cartridge holder and comprising a first stroke limiter, which is adapted to stop the cartridge holder with respect to the supporting element in said position for loading and/or unloading the cartridges.

BRIEF DESCRIPTION OF THE DRAWINGS

Further characteristics and advantages of the present invention will become apparent from the description of a preferred but not exclusive embodiment of an adapter for beverage preparation machines, particularly for preparing espresso coffee, according to the invention, illustrated by way of non-limiting example in the accompanying drawings, wherein:

FIG. 21 is an enlarged-scale sectional view of a detail of the variation of the adapter shown in FIG. 17 in the infusion dispensing position without a cartridge.

DETAILED DESCRIPTION

Figure 1:
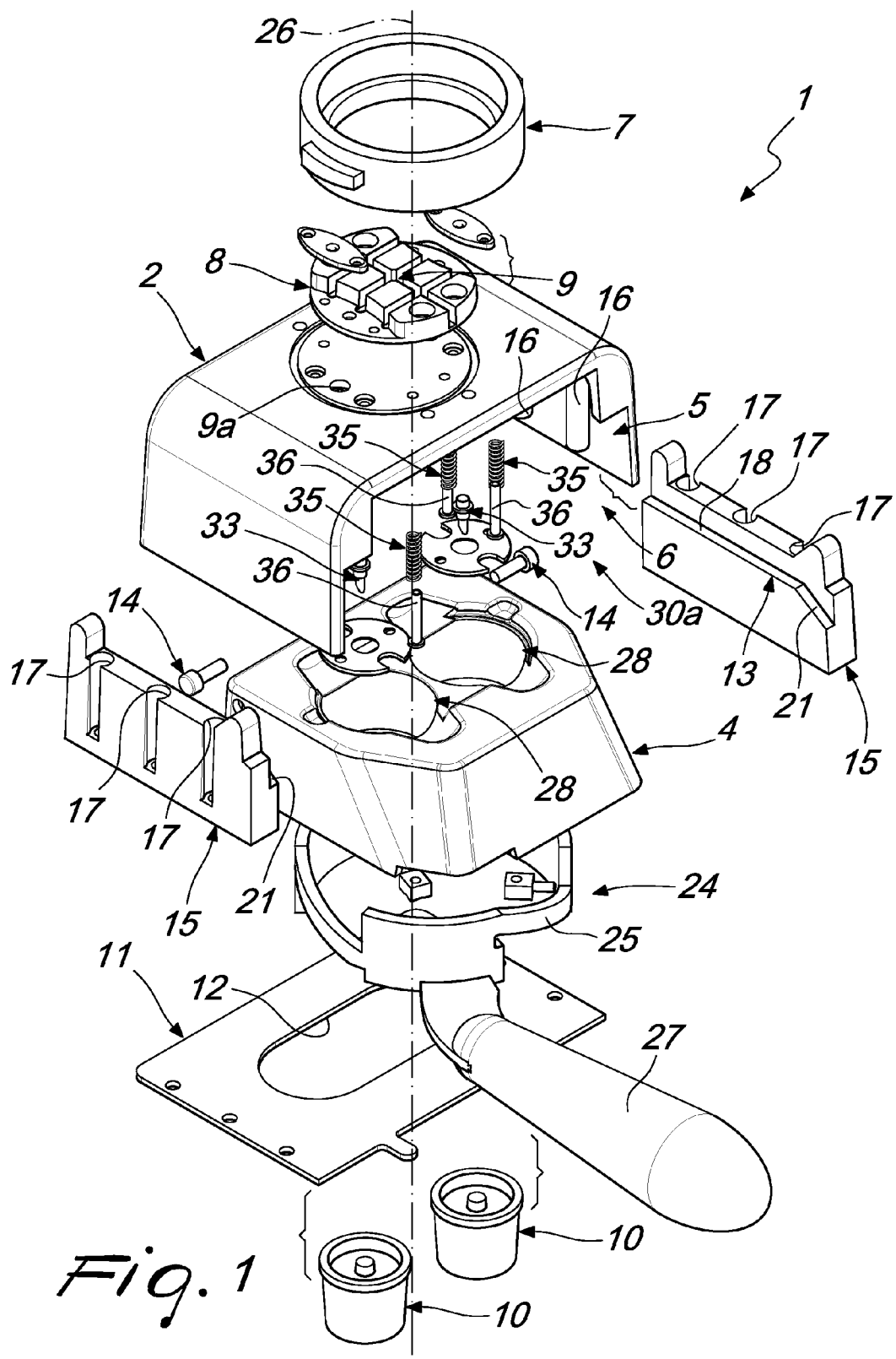
FIG. 1 is an exploded perspective view of an embodiment of an adapter according to the invention.
Figure 2:
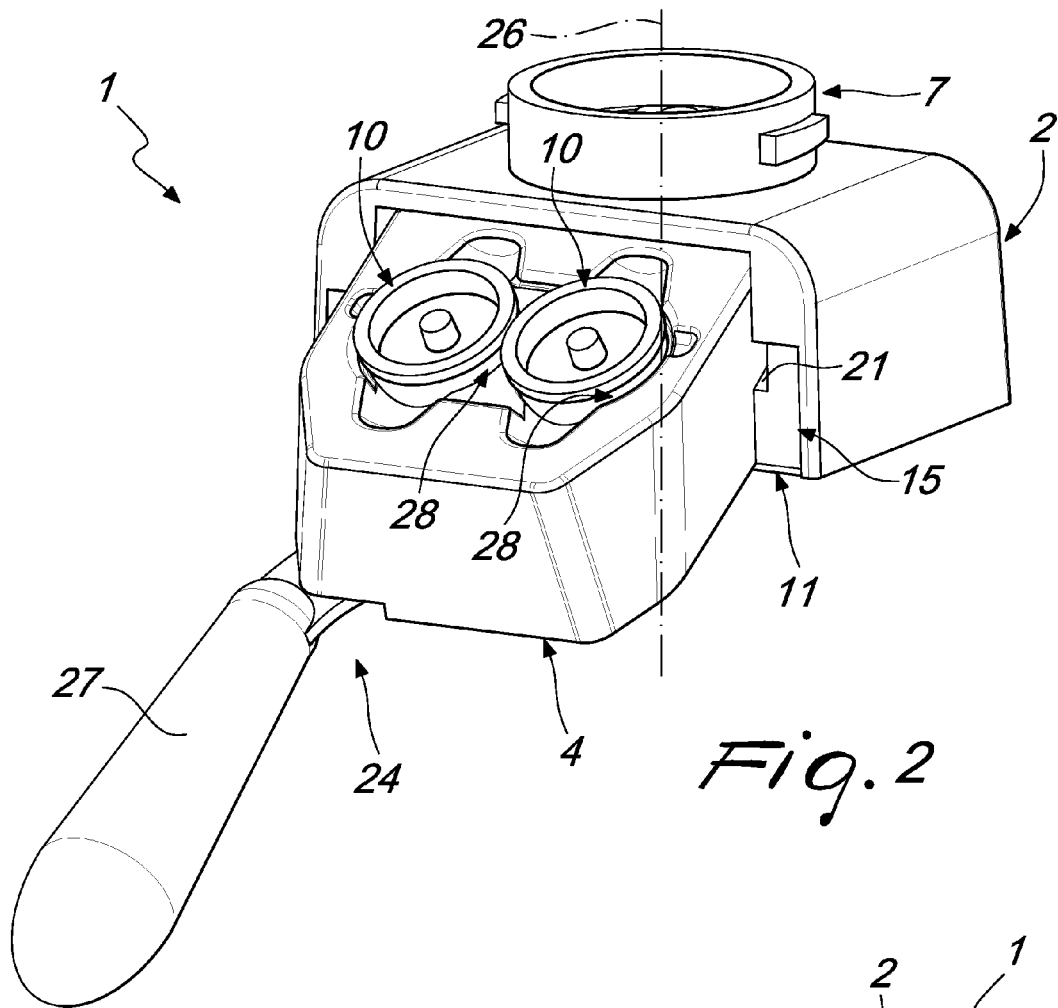
FIG. 2 is a perspective view of the adapter shown in FIG. 1 with the cartridge holder arranged in the position for loading and/or unloading the cartridges.
Figure 3:
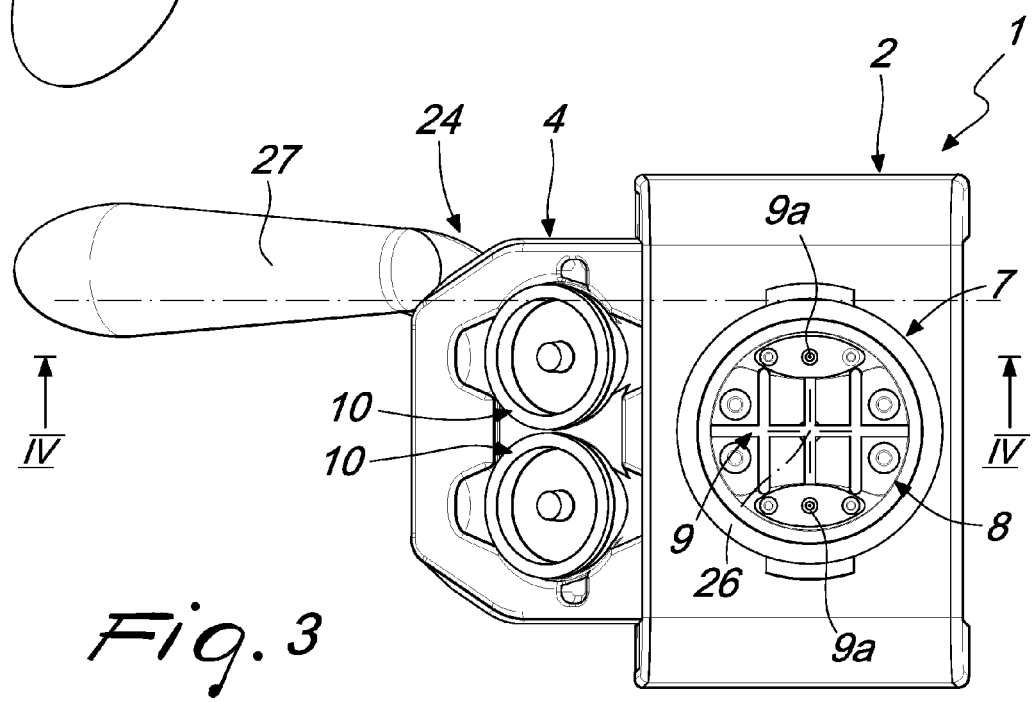
FIG. 3 is a plan view of the adapter shown in FIG. 2.
Figure 4:
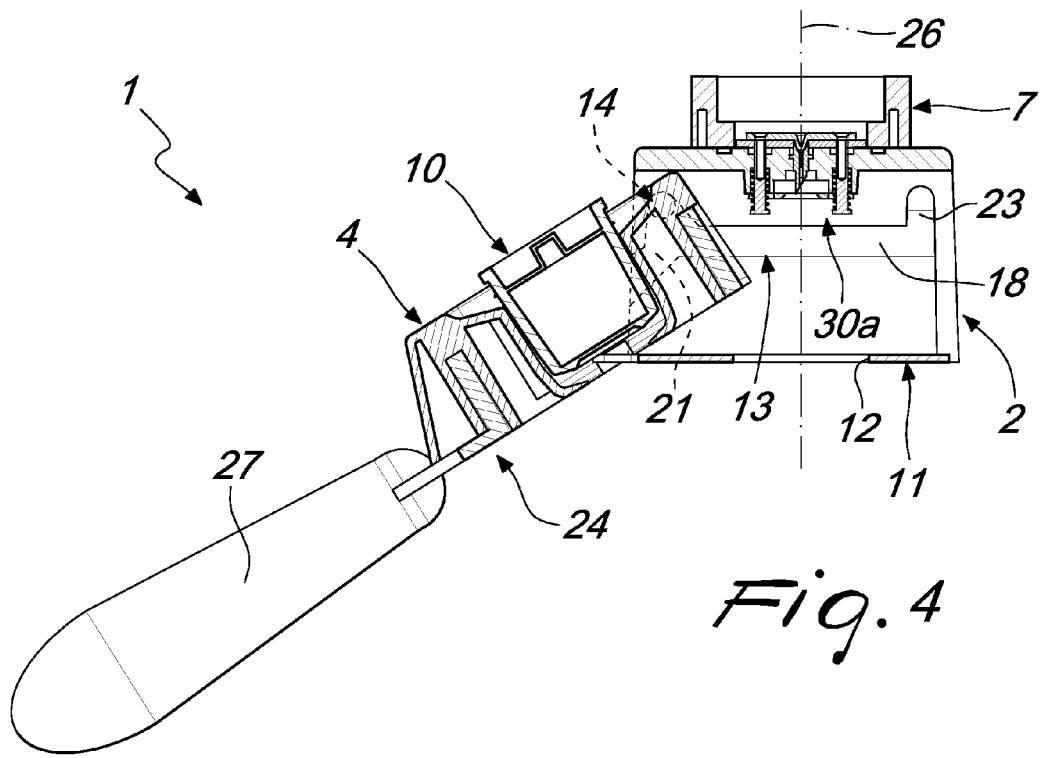
FIG. 4 is a sectional view of the adapter shown in FIG. 3, taken along the line IV-IV.
Figure 5:
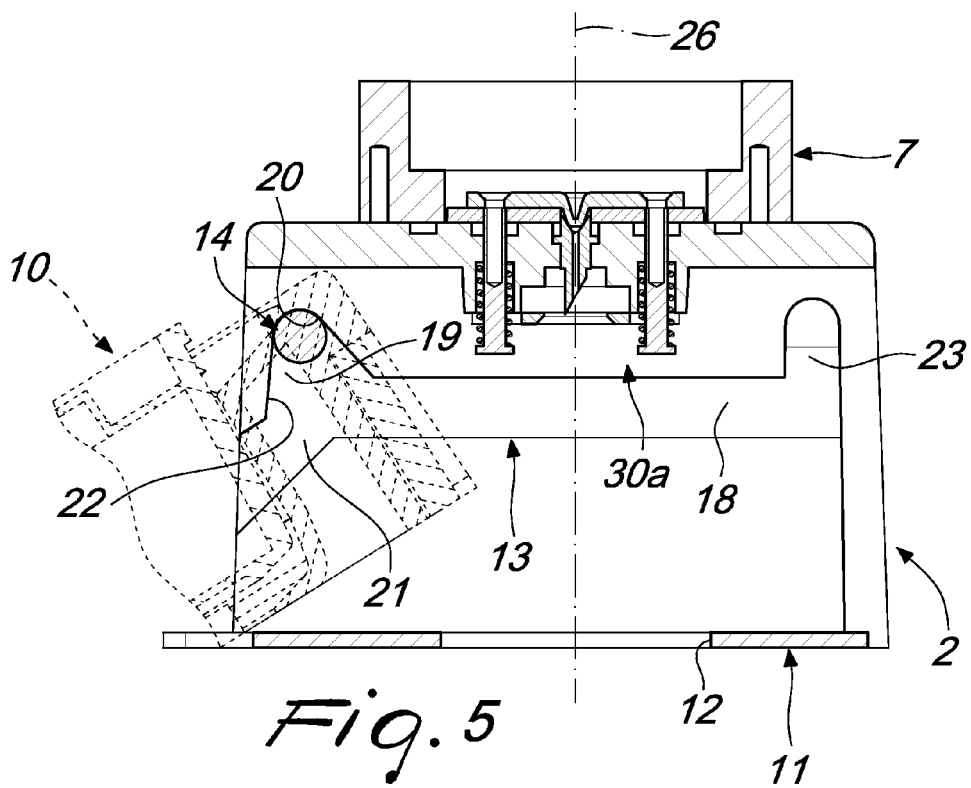
FIG. 5 is an enlarged-scale view of a detail of the guide for the translational motion of the cartridge holder with respect to the supporting element.

With reference to the figures, the adapter for beverage preparation machines, particularly for preparing espresso coffee, generally designated by the reference numeral 1, comprises a supporting element 2, which can be associated with water dispensing means of a beverage preparation machine such as, for example, for preparing espresso coffee, and a cartridge holder 4, which is associated with the supporting element 2. In machines for preparing espresso coffee, as is known, the water dispensing means are capable of dispensing hot water under pressure, typically water at a temperature of approximately 90±2° C. and a pressure of 6-9 bar.

In greater detail, the supporting element 2 is constituted by a hollow body shaped substantially like a parallelepiped, which has, respectively at a lateral face thereof and at its lower face, a front opening 5 and a lower opening 6, for moving the cartridge holder 4.

At its upper face, the supporting element 2 can engage a traditional machine for preparing espresso coffee, not shown, by means of a standard coupling 7 of the bayonet type. Machines for preparing espresso coffee, as is known, have at least one coupling of the bayonet type at least one point for dispensing the hot water under pressure, in order to fix a respective filter basket holder that contains a dose or a cartridge of ground coffee.

The standard coupling 7 of the adapter 1 is shaped identically to the similar coupling used in traditional filter basket holders, i.e., such as to engage a machine for preparing espresso coffee at the means for dispensing hot water under pressure. In this way, the adapter 1 replaces the traditional filter basket holders and is thus perfectly compatible with existing machines for preparing espresso coffee, without requiring them to be modified in order to use the invention.

In greater detail, the standard coupling 7 can engage the corresponding coupling on the machine for preparing espresso coffee so that the dispensing means, once engagement has occurred, communicate with a spreading disc 8, which is arranged between the upper face of the supporting element 2 and the standard coupling 7, said disc 8 having the function of dividing the main water jet dispensed by the dispensing means into two distinct secondary water jets.

The spreading disc 8 has a channel system 9 which merges into two holes 9a, one for each cartridge 10, for the passage of the water 50 dispensed by the dispensing means, as described hereinafter, inside the cartridges 10.

The choice to have two distinct secondary water jets is due to the fact that the illustrated adapter 1 is of the two-cartridge type and it is necessary to define a respective water jet for each cartridge 10.

In a possible variation of the adapter 1 with more than two cartridges, the spreading disc 8 is shaped so as to divide the main water jet into a plurality of secondary jets, one for each cartridge 10 provided.

A closing plate 11 is fixed to the supporting element 2, at its lower opening 6, and delimits in a downward region the internal cavity of the supporting element 2.

In order to allow the infusion to be dispensed into two cups arranged below the adapter 1, the closing plate 11 has an opening 12, which is arranged at the region in which the infusion is dispensed.

The cartridge holder 4 is provided by a substantially prism-shaped body the dimensions of which are such that it can be accommodated inside the supporting element 2.

More precisely, the cartridge holder 4 can be inserted in the supporting element 2 through the front opening 5 of said supporting element 2 and can move, with respect to the latter, from an infusion dispensing position to a position for loading and/or unloading the cartridges 10 and vice versa, passing through two intermediate positions.

According to the invention, the adapter 1 comprises at least one guide 13 for the translational motion of the cartridge holder 4 with respect to the supporting element 2.

Advantageously, in the supporting element 2 there are two guides 13 which are arranged laterally with respect to the front opening 5 of the supporting element 2 and two sliders 14 which are defined on the cartridge holder 4 at the sides of the latter that face the sides of the supporting element 2 where the guides 13 are arranged.

In a possible variation of the adapter 1, not shown, the guides 13 and the sliders 14 can be kinematically reversed, i.e., they can be defined, respectively, on the cartridge holder 4 and on the supporting element 2.

Reverting to the embodiment shown in FIG. 1, the guides 13 are defined in an upward region by adapted inner profiles of the lateral shoulders of the supporting element and, in a downward region, by two lateral elements 15, each of which is fixed inside the supporting element 2 at said lateral shoulders.

More precisely, this fixing occurs by inserting ribs 16 which are defined on the inner walls of the shoulders of the supporting element 2 in adapted slots 17 which are defined on the lateral elements 15. The lateral elements 15 are thus locked against possible sliding motions by means of the closing plate 11, which is fixed to the supporting element 2, by means of screws which are screwed into adapted holes which are provided at the bases of the ribs 16 and pass through the lateral elements 15.

Advantageously, each of the guides 13 comprises a first straight portion 18, which is adapted to allow a sliding of the cartridge holder 4, by way of the sliders 14, with respect to the supporting element 2, from the first intermediate position to the second one and vice versa.

Furthermore, each of the guides 13 comprises a second portion 19, which branches off from a first end of the first portion 18 which is adjacent to the front opening 5 of the supporting element 2, and is inclined with respect to the first portion 18 away from the cartridge holder 4.

At the end of the second portion 19 there is a first stroke limiter 20, which is adapted to stop the stroke of the cartridge holder 4 with respect to the supporting element 2 when the position for loading and/or unloading the cartridges 10 occurs, as shown in FIGS. 2-5.

In order to completely remove the cartridge holder 4 from the supporting element 2, at the first end of the first portion 18 that is adjacent to the front opening 5 of the supporting element 2, there is a guiding portion 21 which is inclined with respect to the first portion 18 away from the second portion 19.

Figure 8:
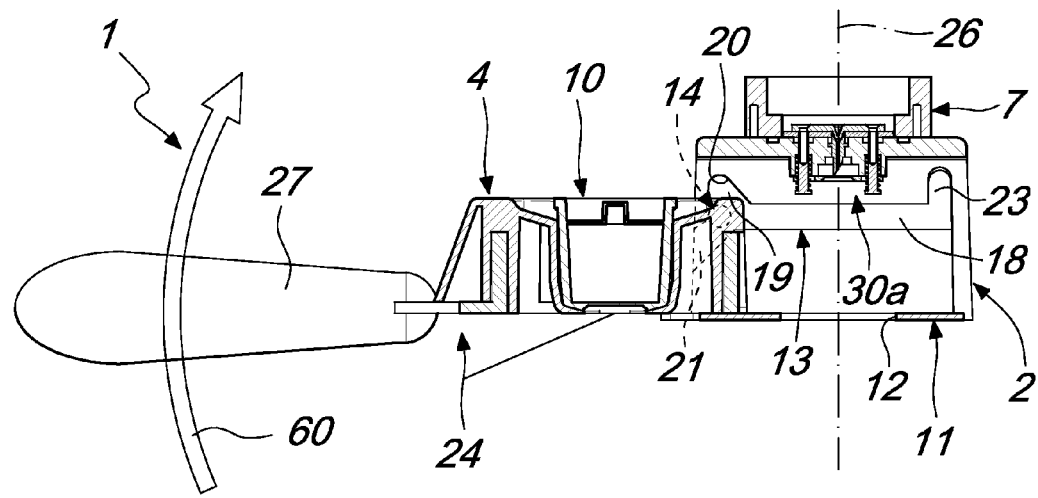
FIG. 8 is a sectional view of the adapter shown in FIG. 7, taken along the line VIII-VIII.
Figure 9:
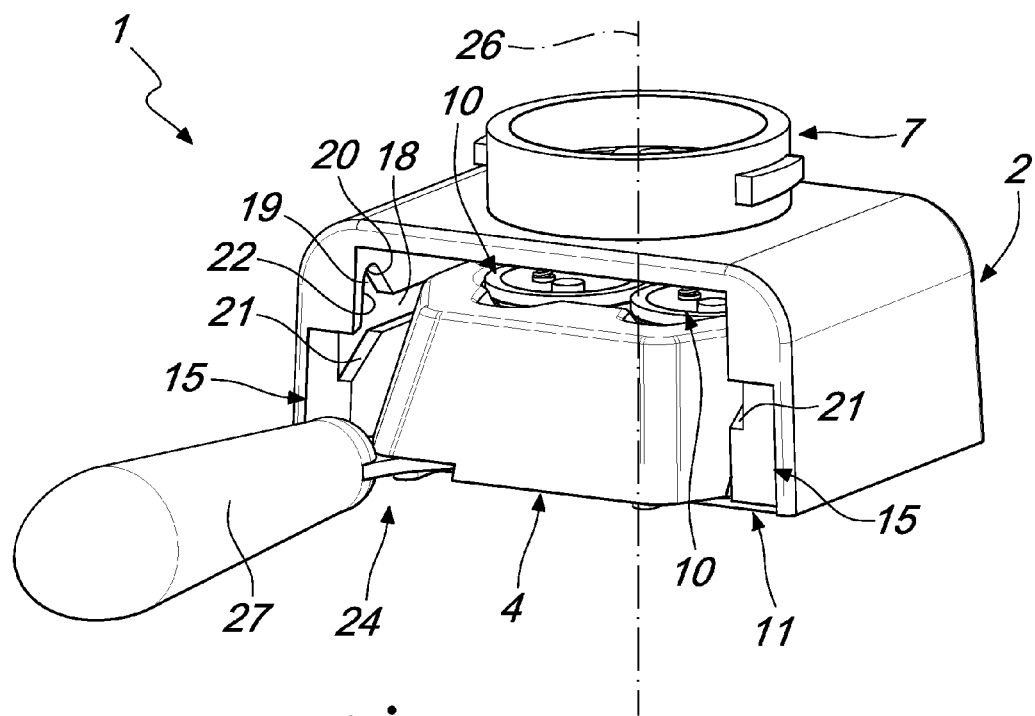
FIG. 9 is a perspective view of the adapter shown in FIG. 1 with the cartridge holder arranged in a second position which is intermediate between the first intermediate position and the infusion dispensing position.
Figure 10:
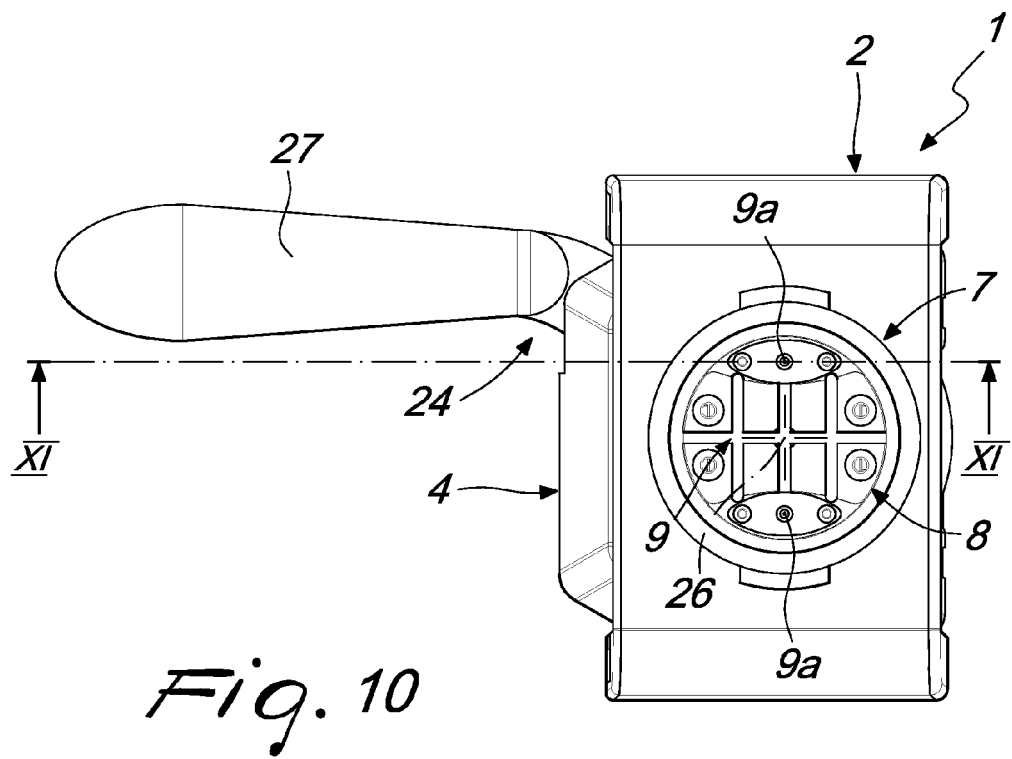
FIG. 10 is a plan view of the adapter shown in FIG. 9.
Figure 11:
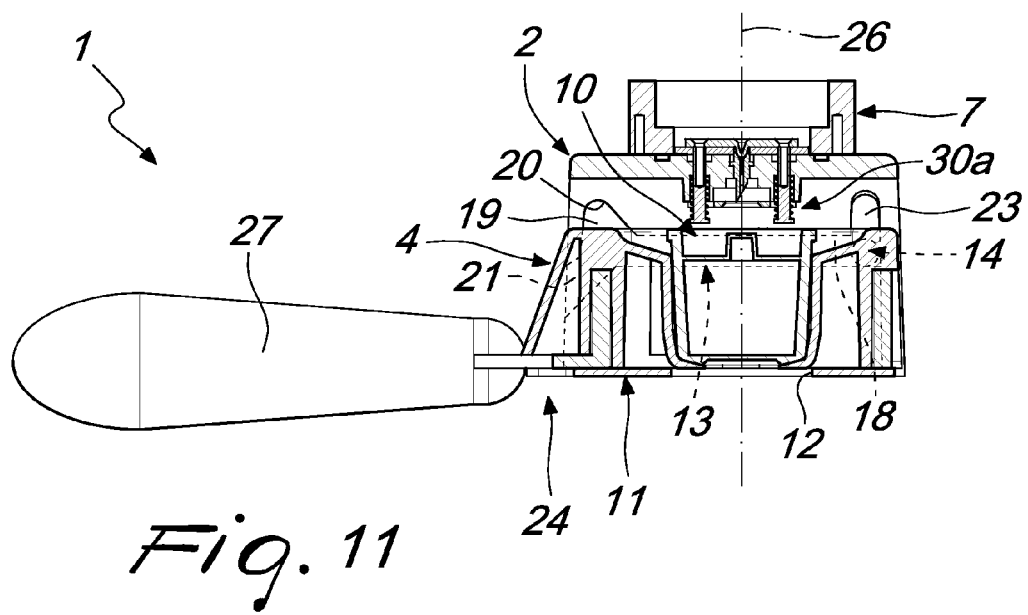
FIG. 11 is a sectional view of the adapter shown in FIG. 10, taken along the line XI-XI.
Figure 12:
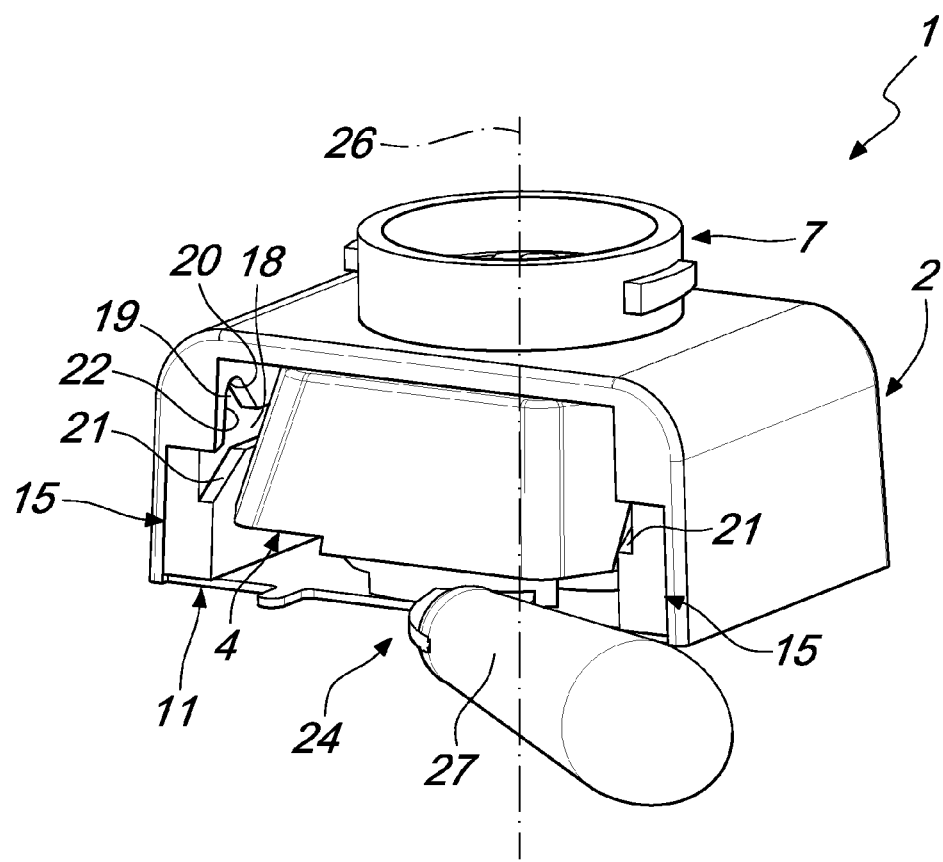
FIG. 12 is a perspective view of the adapter shown in FIG. 1, with the cartridge holder arranged in the infusion dispensing position.
Figure 13:
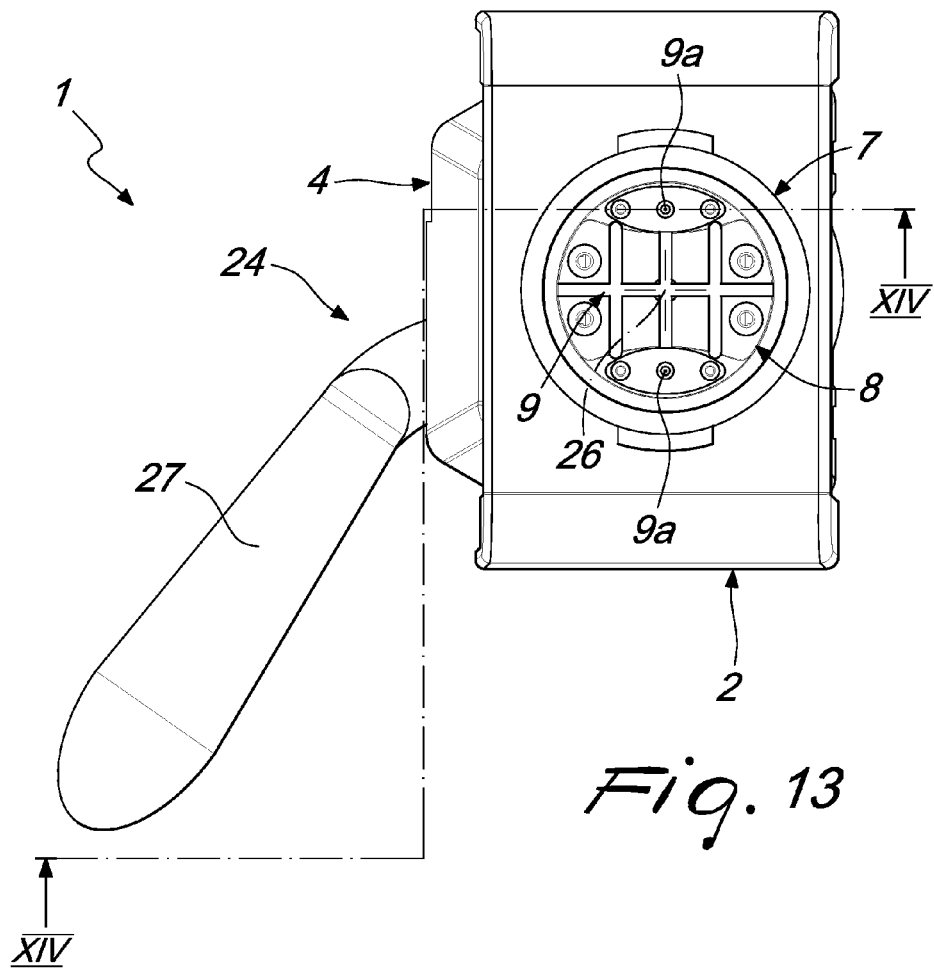
FIG. 13 is a plan view of the adapter shown in FIG. 12.

Advantageously, again at the first end of the first portion 18 and at the guiding portion 21, there is a second stroke limiter 22, which is adapted to define an abutment for the sliders 14 with which such sliders 14 can be used substantially as a fulcrum for the cartridge holder 4 in the rotary motion, indicated with the arrow 60 in FIG. 8, that leads to the complete separation of the cartridge holder 4 from the supporting element 2.

At the second end of the first portion 18, which lies substantially opposite to the first end of the first portion 18 and extends toward the upper surface of the supporting element 2, i.e., toward the dispensing means, in order to guide the cartridge holder 4 toward said dispensing means, each of the guides 13 has a third portion 23, which branches out substantially at right angles to the first portion 18. The third portion 23 thus allows the vertical translational motion of the cartridge holder 4 with respect to the supporting element 2 toward the infusion dispensing position.

The movement of the cartridge holder 4 with respect to the supporting element 2 along the guides 13 is provided thanks to the presence of movement means 24, which are adapted to move the cartridges 10 toward or away from the dispensing means.

In greater detail, the movement means 24 comprise a movement ring 25, which is associated with the cartridge holder 4 by means of a cam which is integral with the ring 25, which can produce the translational motion of the cartridge holder 4 along the rotation axis 26 of the movement ring 25 as a consequence of the relative rotation of the movement ring 25 with respect to the axis 26.

According to a reference system which is integral with the supporting element 2, the movement ring 25 can rotate about its own axis 26 and does not perform a translational motion.

The rotation of the movement ring 25 can be achieved manually by way of the presence of at least one handle 27, which is fixed to the movement ring 25 and is adapted to rotate it with respect to the cartridge holder 4.

As already mentioned, the adapter 1 is of the two-cartridge type. For this purpose, the cartridge holder 4 comprises a pair of receptacles 28 for respective cartridges 10 for infusions or the like. Obviously, there can be more than two receptacles, depending on the number of simultaneous extractions of beverages that one wishes to obtain. However, in machines for preparing espresso coffee, the preferred number of receptacles 28 is two in number.

Such receptacles 28 are defined on the upper part of the cartridge holder 4 which faces the dispensing means.

Figure 15:
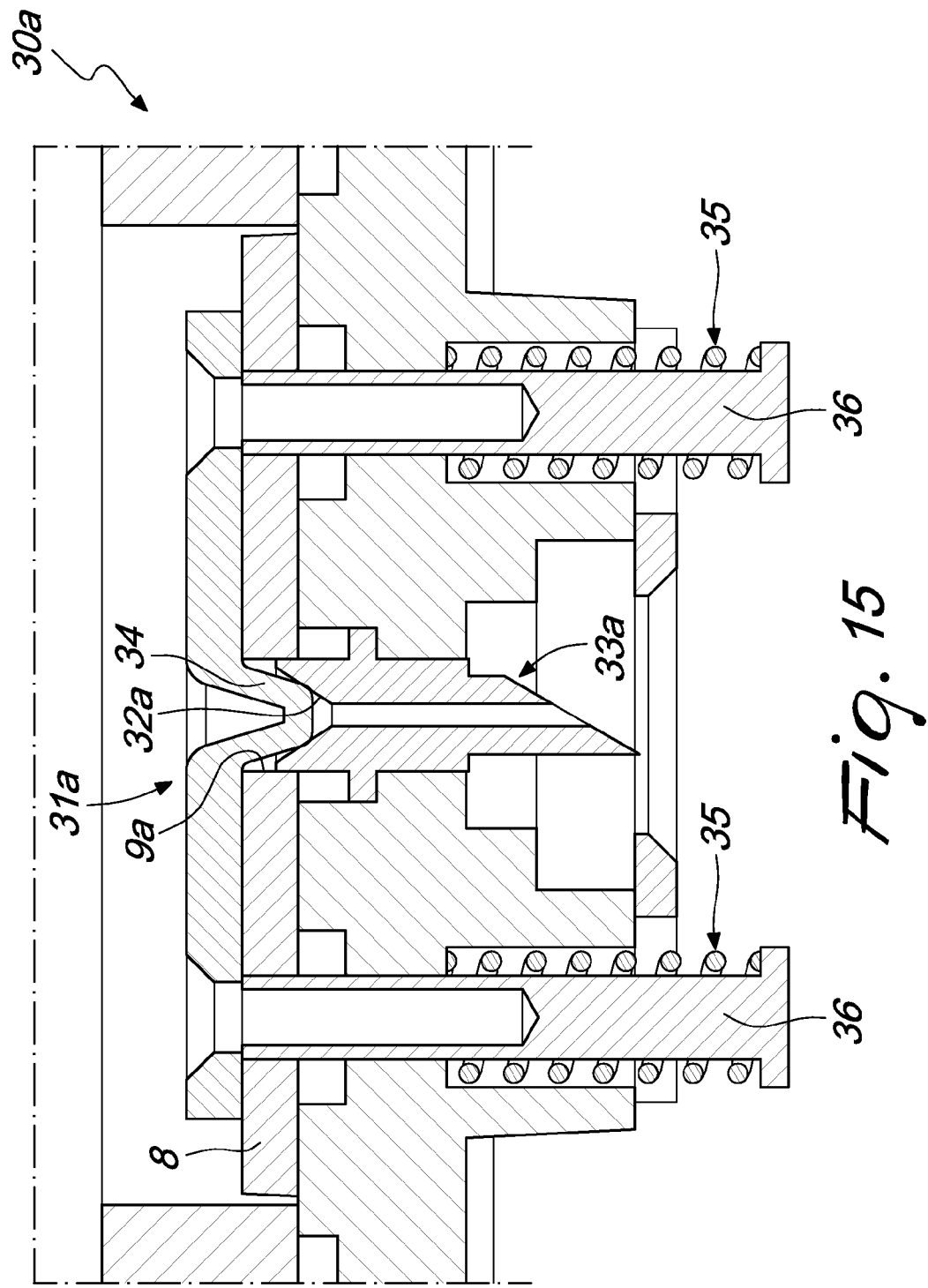
FIG. 15 is a sectional view of a first embodiment of the means for detecting the presence of the cartridge, in the position shown in FIG. 11.
Figure 16:
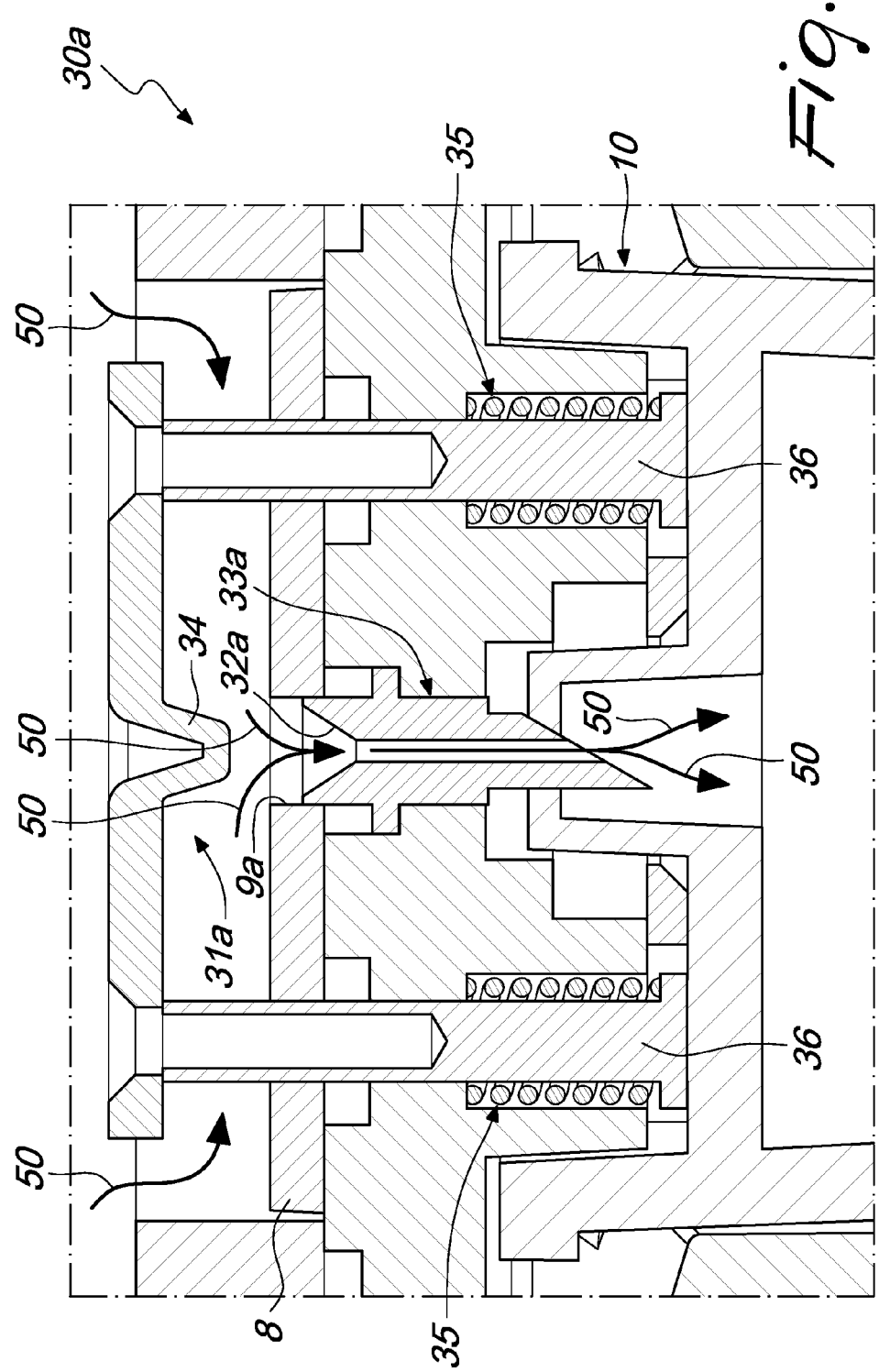
FIG. 16 is a sectional view of the first embodiment of the means for detecting the presence of the cartridge, in the position shown in FIG. 14.
Figure 17:
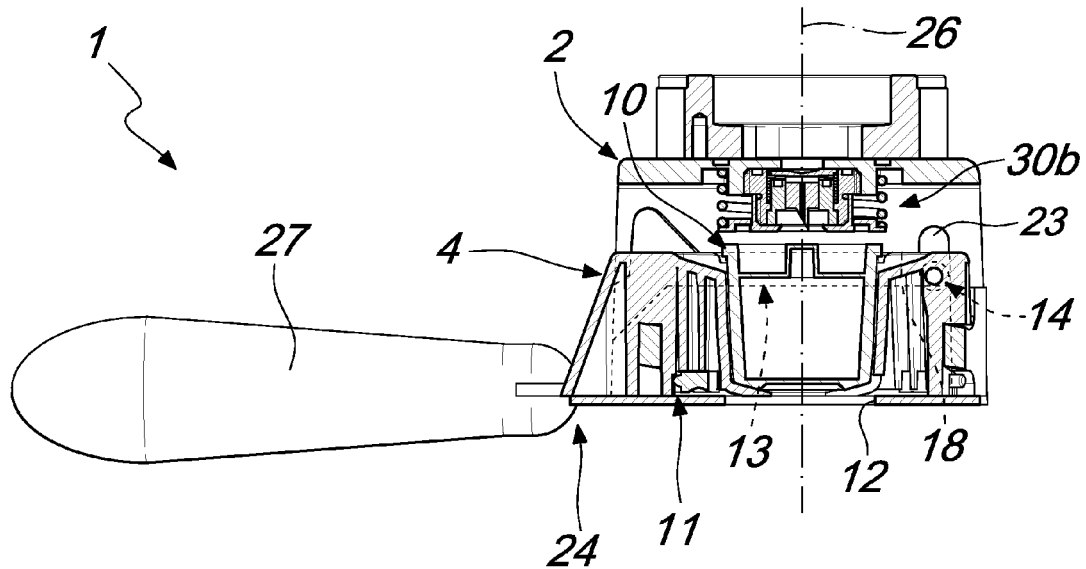
FIG. 17 is a sectional view of a variation of the adapter according to the invention, with the cartridge holder arranged in the second intermediate position.
Figure 18:
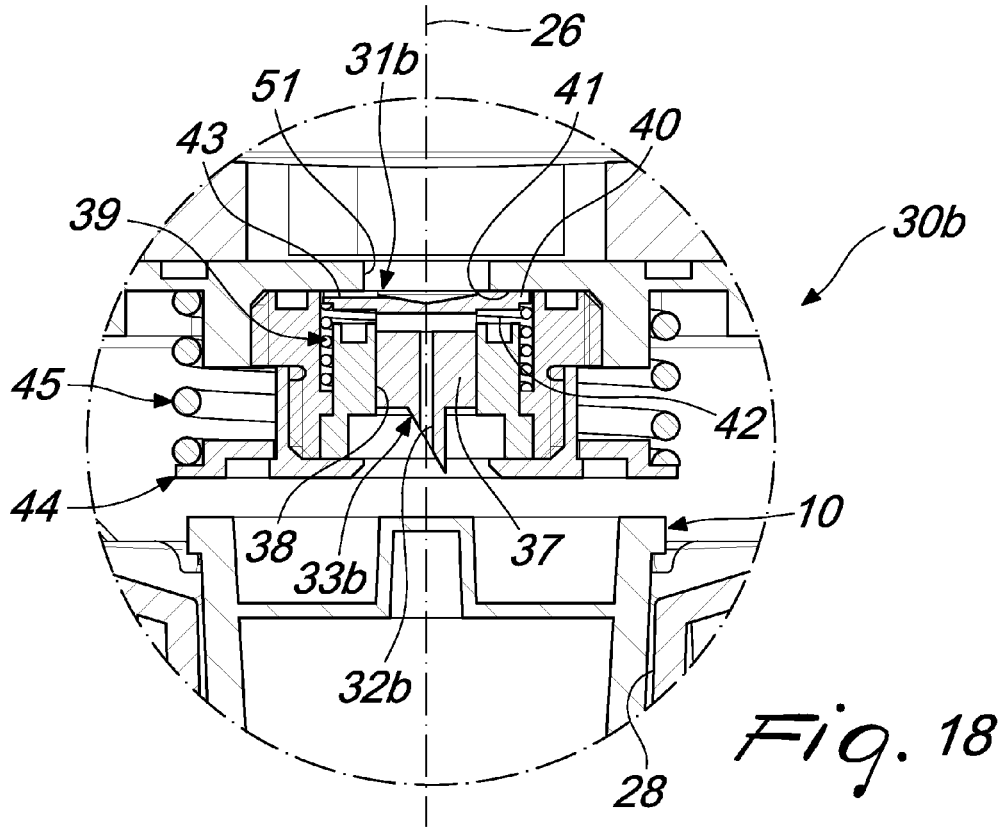
FIG. 18 is a sectional view of a second embodiment of the means for detecting the presence of the cartridge, in the position shown in FIG. 17.
Figure 19:
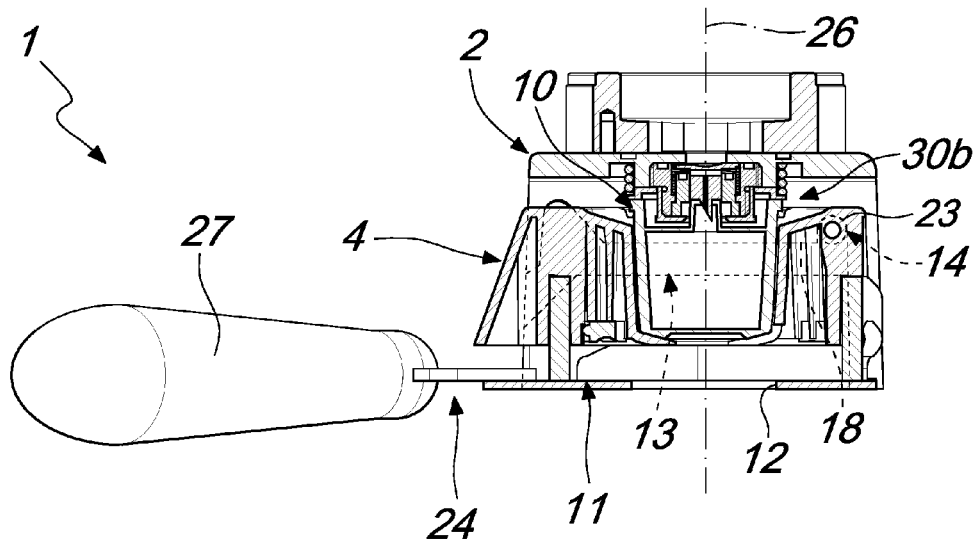
FIG. 19 is a sectional view of the variation of the adapter shown in FIG. 17, in the infusion dispensing position.
Figure 20:
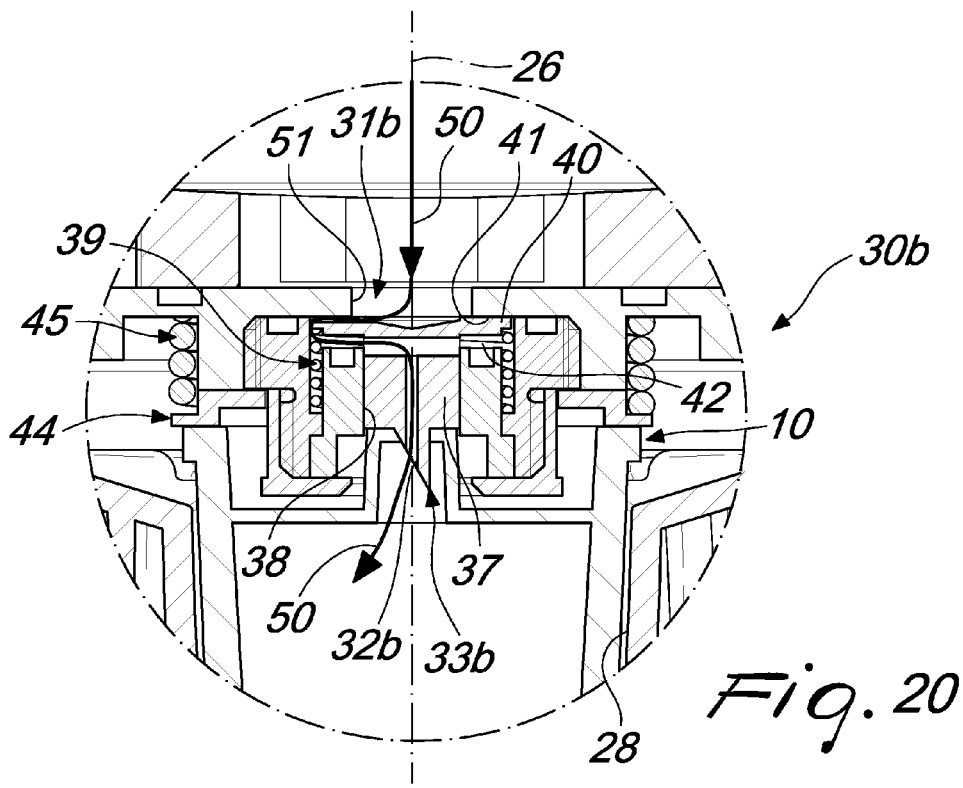
FIG. 20 is a sectional view of the second embodiment of the means for detecting the presence of the cartridge, in the position shown in FIG. 19.

With particular reference to the first embodiment of the invention shown in FIGS. 15 and 16, on the inner part of the supporting element 2 which faces the upper part of the cartridge holder 4 there are first means 30a for detecting the presence of the cartridges 10 in the receptacles 28 and first flow control means 31a for respective ports 32a for the flow of water toward the cartridges 10.

Advantageously, the first detection means 30a are associated with the first flow control means 31a in order to clear or block the respective flow port 32a respectively in the presence or in the absence of one of the cartridges 10 in the respective receptacle 28.

In greater detail, there are two first hollow perforators 33a, which are fixed to the supporting element 2 and define the respective flow ports 32a through which water 50 is injected into the cartridges 10.

Figure 14:
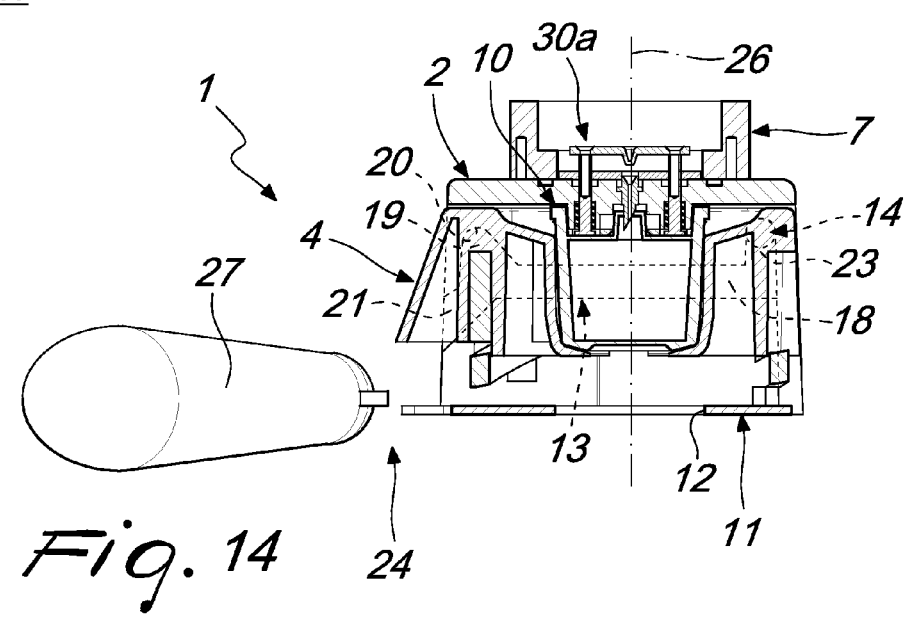
FIG. 14 is a sectional view of the adapter shown in FIG. 13, taken along the line XIV-XIV.

The first perforators 33a penetrate in the respective cartridges 10 with the cartridge holder 4 arranged in the infusion dispensing position (FIG. 14).

More specifically, the first flow control means 31a provide two normally-closed valves, which operate independently of each other and can be opened in the presence of a respective cartridge 10 in its own receptacle 28. Each valve is composed substantially of a flow control element 34, which engages the respective flow port 32a as a consequence of the action of first elastic means 35, for example first helical springs.

As illustrated more clearly in FIGS. 15 and 16, for each first flow control means 31a there are two stems 36, which orthogonally protrude into the receptacles 28 and have, as first elastic means 35, the respective first helical springs fitted coaxially over them. If the corresponding cartridge 10 is present, then when the cartridge holder 4 is moved closer to the dispensing means the cartridge 10 pushes the stems 36 toward the dispensing means, overcoming the action of the first elastic means 35 and clearing the flow port 32a from the flow control element 34, which is translationally integral with the two stems 36.

With reference to an alternative embodiment of the invention, illustrated in some details in FIGS. 17 to 21, there can be second detection means 30b instead of the first detection means 30a, while the structure that allows the cartridge holder 4 to be moved with respect to the supporting element 2 remains the same as in the first embodiment; in this regard, in the second embodiment of FIGS. 17-21, identical reference numerals correspond to identical structures of the first embodiment in FIGS. 1-16.

The second detection means 30b are associated with second flow control means 31b in order to clear or block a respective port 32b for the flow of water respectively in the presence or in the absence of one of the cartridges 10 in the respective receptacle 28.

More specifically, the second detection means 30b and the second flow control means 31b define, for each of the receptacles 28, a normally-open valve which closes owing to the pressure of the water 50 dispensed by the dispensing means and in the absence of a respective cartridge 10 from the receptacle 28.

For each receptacle 28 there is a cylinder 37, which slides axially along the axis 26 with respect to the supporting element 2 in a respective cylindrical sliding channel 38, which is fixed with respect to the supporting element 2. Such sliding occurs in opposition to second elastic means 39, which are constituted for example by a second helical spring, which is fitted externally over the cylinder 37 and is interposed between a fixed part of the supporting element 2 and a flange 40 which is integral with the cylinder 37 and is grooved in an upward region. The purpose of the second elastic means 39 is to keep open the valve that results from the combination of the second detection means 30b and the second flow control means 31b, both in the condition in which there is a cartridge 10 in the corresponding receptacle 28, and also in the absence of water being dispensed in input and in the absence of a cartridge in the receptacle. This means that the valve remains open when a cartridge is inserted in the receptacle 28 and the cartridge holder 4 is brought to the infusion dispensing position, i.e., the valve is not opened by the cartridge.

Preferably, the second elastic means 39 are dimensioned so as to keep the flange 40 in abutment against an abutment wall 41 of the supporting element 2, which is defined at the inlet holes 51 for the water 50 that arrives from the dispensing means.

Moreover, on the lower face of each cylinder 37, on the opposite side with respect to the flange 40, there is a perforator 33b, which is adapted to penetrate in the cartridge 10 which is accommodated in the respective receptacle 28 with the cartridge holder 4 arranged in the infusion dispensing position.

The port 32b for the flow of water 50 is defined in each cylinder 37. In greater detail, the flow port 32b is provided by a T-shaped pipe, which has a first portion and a second portion at right angles to the first one. The first portion of the T-shaped pipe is coaxial to the respective perforator 33b and is open at the tip thereof in order to communicate with the cartridge 10, while the second portion runs radially through the cylinder 37 from side to side in order to provide more inlets for the water 50 that arrives from the dispensing means.

In the presence of the respective cartridge 10 or in the absence of water 50 under pressure, the cylinder 37, owing to the second elastic means 39 or to the presence of the cartridge 10, is arranged in its upper position, with the flange 40 in abutment against the abutment wall 41.

In this position, the ends of the radial portion of the flow port 32b lead into a connecting chamber 42, which in turn is connected to the dispensing means by way of slots 43 which are defined on the face of the flange 40 that abuts against the abutment wall 41.

In the absence of the respective cartridge 10 and owing to the pressure applied by the water 50 which is dispensed by the dispensing means, the cylinder 37 is moved into its lower stroke end position, shown in FIG. 21, in which the ends of the radial portion of the flow port 32b are closed completely by the lateral walls of the sliding channel 38, thus preventing the flow of water.

In the second embodiment of the adapter 1 there is moreover a thrust plate 44, which thanks to the presence of third elastic means 45, which comprise for example of a third helical spring interposed between the thrust plate 44 and a fixed part of the supporting element 2, push the cartridge 10 that is accommodated in the respective receptacle 28 against the bottom of the receptacle 28, so as to facilitate the removal of the cartridge 10 when the cartridge holder is moved from the infusion dispensing position to the second intermediate position.

As is apparent from the above description, operation of the adapter 1 for beverage preparation machines, particularly for preparing espresso coffee, is as follows.

With particular reference to FIGS. 2 to 5, starting from the position for loading and/or unloading the cartridges 10 of the cartridge holder 4, at least one cartridge 10 is loaded by inserting it into one of the receptacles 28.

In this position, the centre of gravity of the structure that comprises the cartridge holder 4 and the corresponding movement means 24 is located outside the supporting element 2. Accordingly, the cartridge holder 4 tilts autonomously by gravity, since it is substantially hinged by means of the sliders 14 at the first stroke limiter 20, and rests against the closing plate 11 with such an inclination as to direct the upper part, which defines the receptacles 28, toward the user: thus the user has an excellent view for performing the operations for loading and/or unloading the cartridges 10.

Figure 6:
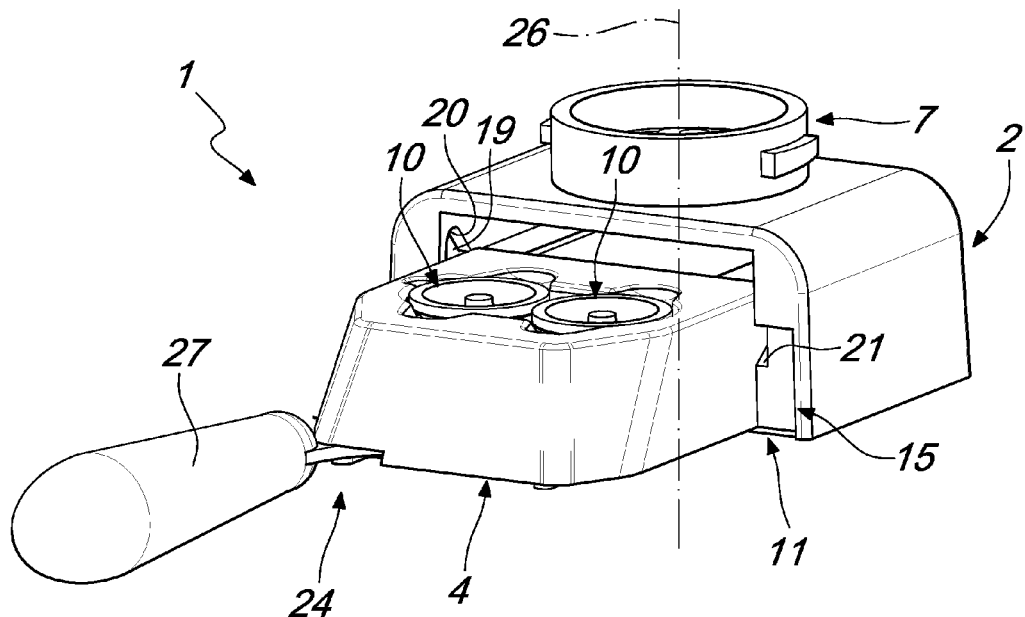
FIG. 6 is a perspective view of the adapter shown in FIG. 1, with the cartridge holder arranged in a first position which is intermediate between the loading and/or unloading position and the infusion dispensing position.
Figure 7:
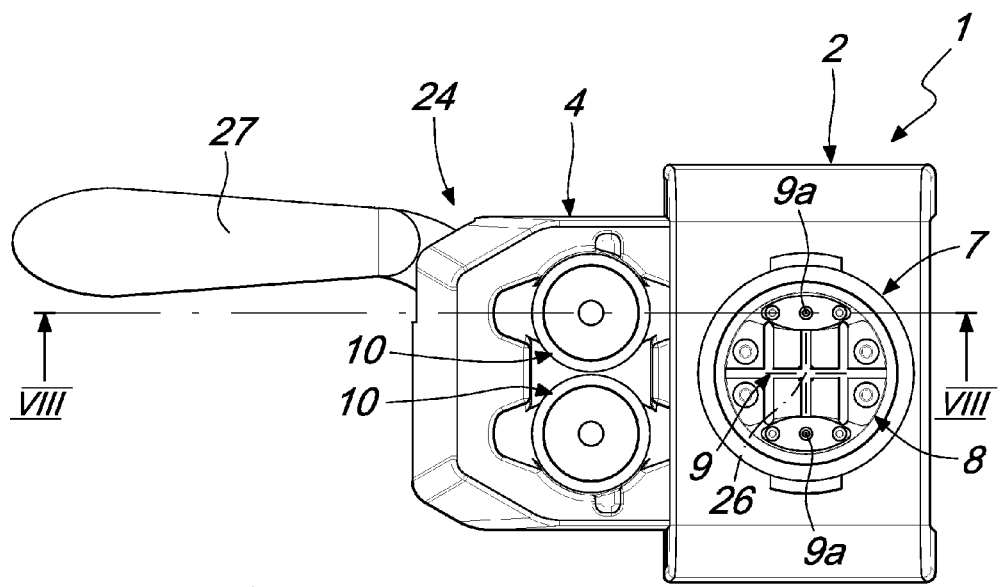
FIG. 7 is a plan view of the adapter shown in FIG. 6.

With particular reference to FIGS. 6 to 8, once at least one cartridge 10 has been loaded, the cartridge holder 4 is brought to the first intermediate position by rotating the handle 27 with respect to the axis of the sliders 14, until a substantially horizontal orientation of the cartridge holder 4 is reached.

Subsequently, with particular reference to FIGS. 9 to 11, again by means of the handle 27, the cartridge holder 4 is pushed inside the supporting element 2, following the path defined by the first portion 18 of the guides 13, up to the base of the third portion 23.

Owing to the position and the shape of the third portion 23 with respect to the first portion 18, the horizontal stroke of the cartridge holder 4 is stopped upon reaching the second intermediate position.

With particular reference to FIGS. 12 to 21, in order to reach the infusion dispensing position the handle 27 is rotated through approximately 45° so that the cam-like coupling between the movement ring 25 and the cartridge holder 4 converts the rotary motion of the movement ring 25 with respect to the cartridge holder 4 into a translational motion of the latter along the axis 26 in the direction of the dispensing means.

In the first embodiment of the invention (FIGS. 12-16), during this translational motion the cartridges 10, if present, are pushed against the stems 36, which by overcoming the action of the first elastic means 35 move the flow control element 34 and clear the flow port 32a of the respective perforator 33a.

Once the end of the stroke of the stems 36 has been reached, the perforator 33a penetrates in the respective cartridge 10, thus providing a fluid connection between the cartridge 10 and the water dispensing means.

If the cartridge 10 is not present in the respective receptacle 28, then the flow control element 34 remains engaged on the respective flow port 32a.

In the second embodiment of the invention (some details of which are illustrated in FIGS. 17 to 21), the cartridges 10, if present, are instead perforated by the perforator 33b and a fluid connection is provided between the cartridges 10 and the water dispensing means.

If the cartridge 10 is not present in the respective receptacle 28, then the cylinder 37 is pushed into its sliding channel 38 owing to the pressure applied by the water 50 dispensed by the dispensing means away from the latter, closing the ends of the radial portion of the flow port 32b and thus preventing the flow of the water.

Regardless of the variation considered, once the infusion has been obtained, the cartridge holder 4 can be selectively returned to the position for loading and/or unloading the cartridges 10 simply by repeating the procedure described so far in reverse.

If it is necessary to completely remove the cartridge holder 4 from the supporting element 2 for maintenance, cleaning or other reasons, then starting from the first intermediate position the handle 27 is made to rotate upward with respect to the axis that passes through the sliders 14, so that the sliders can be guided toward the guiding portion 21 and the entire body formed by the cartridge holder and the corresponding movement means 24 is removed from the supporting element 2.

In practice it has been found that the adapter according to the present invention fully achieves the intended aim, since it allows the loading and unloading of the cartridges from the cartridge holder by means of a structure that is simple and easy to use.

Another advantage of the adapter according to the present invention comprises in that in addition to the operations for loading and/or unloading the cartridges, it makes it possible to easily perform the operations for providing the infusion and to perform the operations for maintenance or cleaning of the adapter thanks to the easy removability of the cartridge holder from the supporting element.

A further advantage of the adapter according to the present invention is that it is possible to use a plurality of cartridges at a time on traditional beverage preparation machines, without preventing the use of a single cartridge at a time.

The adapter thus conceived is susceptible of numerous modifications and variations, all of which are within the scope of the appended claims.

Moreover, all the details may be replaced with other technically equivalent elements. For example, the cartridges illustrated herein are of the rigid type, but the use of flexible cartridges with permeable enclosure, for example E.S.E (Espresso Serving System) cartridges, can be provided.

In practice, the materials used, so long as they are compatible with the specific use, as well as the contingent shapes and dimensions, may be any according to requirements and to the state of the art.

The disclosures in Italian Patent Application No. MI2010A000239 from which this application claims priority are incorporated herein by reference.

What is claimed is:

1. An adapter for beverage preparation machines, comprising a supporting element which can be associated with water dispensing means by means of a bayonet coupling of said adapter, and a cartridge holder associated with said supporting element, said cartridge holder comprising a plurality of receptacles for respective cartridges for infusions, said cartridge holder being movable with respect to said supporting element from a position for dispensing the infusion to a position for loading and unloading said cartridges, said supporting element being provided with a front opening for moving said cartridge holder from said position for dispensing the infusion to said position for loading and unloading said cartridges and vice versa, wherein said adapter comprises at least one guide for the translational motion of said cartridge holder with respect to said supporting element, said at least one guide comprising a first straight portion which is adapted to allow a sliding of said cartridge holder with respect to said supporting element between two intermediate positions comprised between said loading and unloading position and said infusion dispensing position, said at least one guide further comprising a second portion that branches off from a first end of said first straight portion, said first end being adjacent to said front opening of said supporting element, said second portion being inclined with respect to said first straight portion away from said cartridge holder and comprising a first stroke limiter, which is adapted to stop said cartridge holder with respect to said supporting element in said position for loading and unloading said cartridges, said adapter further comprising means with manual activation for moving said cartridge holder with respect to said supporting element in order to move said cartridge holder and move said cartridges closer to dispensing means, said means comprise a movement ring, which is associated with said cartridge holder by means of a cam integral with the movement ring for the relative translational motion of said cartridge holder with respect to said movement ring along a rotational axis of the movement ring as a consequence of the relative rotation of said movement ring with respect to said cartridge holder around the rotational axis of the movement ring.

2. The adapter according to claim 1, wherein said first straight portion of said at least one guide comprises, at said first end which is adjacent to said front opening, a guiding portion which is inclined with respect to said first straight portion away from said second portion, in order to completely remove said cartridge holder from said supporting element.

3. The adapter according to claim 2, wherein said second portion comprises a second stroke limiter at said first end of said first straight portion and at said guiding portion.

4. The adapter according to claim 1, comprising two of said guides which are arranged laterally with respect to said front opening of said supporting element and two sliders which are slidably engaged in said guides.

5. The adapter according to claim 1, wherein said at least one guide comprises a third portion which branches out at a second end of said first straight portion which is opposite to said first end and extends toward said dispensing means in order to guide said cartridge holder toward said dispensing means.

6. The adapter according to claim 5, wherein said third portion extends at right angles to said first straight portion.

7. The adapter according to claim 1, wherein said means comprise a handle which is fixed to said movement ring and is adapted to turn said movement ring with respect to said cartridge holder.

8. The adapter according to claim 1, further comprising detection means configured for detecting the presence of said cartridges in said receptacles and flow control means configured for respective flow ports for the flow of water toward said cartridges, said detection means being associated with said flow control means in order to clear or obstruct the respective flow port respectively in the presence or in the absence of one of said cartridges in a respective one of said receptacles.

9. The adapter according to claim 8, wherein said detection means and said flow control means define, for each of said receptacles, a normally-open valve which can be closed owing to the pressure of the water dispensed by said dispensing means in the absence of a respective cartridge in said receptacle.

10. The adapter according to claim 4, wherein said two guides are arranged on opposite sides of said supporting element, and said two sliders are arranged on opposite sides of said cartridge element.

11. The adapter according to claim 1, wherein said cartridge holder arranged in said loading and unloading position is tilted with respect to said cartridge holder arranged in one of said intermediate positions at said first end of said first straight portion.

12. An adapter for beverage preparation machines, comprising a supporting element which can be associated with water dispensing means by means of a bayonet coupling of said adapter, and a cartridge holder associated with said supporting element, said cartridge holder comprising a plurality of receptacles for respective cartridges for infusions, said cartridge holder being movable with respect to said supporting element from a position for dispensing the infusion to a position for loading and unloading said cartridges, said supporting element being provided with a front opening for moving said cartridge holder from said position for dispensing the infusion to said position for loading and unloading said cartridges and vice versa, wherein said adapter comprises at least one guide for the translational motion of said cartridge holder with respect to said supporting element, said at least one guide comprising a first straight portion which is adapted to allow a sliding of said cartridge holder with respect to said supporting element between two intermediate positions comprised between said loading and unloading position and said infusion dispensing position, said at least one guide further comprising a second portion that branches off from a first end of said first straight portion, said first end being adjacent to said front opening of said supporting element, said second portion being inclined with respect to said first straight portion away from said cartridge holder and comprising a first stroke limiter, which is adapted to stop said cartridge holder with respect to said supporting element in said position for loading and unloading said cartridges, said first straight portion of said at least one guide comprising, at said first end which is adjacent to said front opening, a guiding portion which is inclined with respect to said first straight portion away from said second portion, in order to completely remove said cartridge holder from said supporting element, said at least one guide further comprising a third portion which branches out at a second end of said first straight portion which is opposite to said first end and extends toward said dispensing means in order to guide said cartridge holder toward said dispensing means, and said cartridge holder arranged in said loading and unloading position being tilted with respect to said cartridge holder arranged in one of said intermediate positions at said first end of said first straight portion.

13. An adapter for beverage preparation machines, comprising a supporting element which can be associated with water dispensing means, and a cartridge holder associated with said supporting element, said cartridge holder comprising a plurality of receptacles for respective cartridges for infusions, said cartridge holder being movable with respect to said supporting element from a position for dispensing the infusion to a position for loading and unloading said cartridges, said supporting element being provided with a front opening for moving said cartridge holder from said position for dispensing the infusion to said position for loading and unloading said cartridges and vice versa, wherein said adapter comprises at least one guide for the translational motion of said cartridge holder with respect to said supporting element, said at least one guide comprising a first straight portion which is adapted to allow a sliding of said cartridge holder with respect to said supporting element between two intermediate positions comprised between said loading and unloading position and said infusion dispensing position, said at least one guide further comprising a second portion that branches off from a first end of said first straight portion, said first end being adjacent to said front opening of said supporting element, said second portion being inclined with respect to said first straight portion away from said cartridge holder and comprising a first stroke limiter, which is adapted to stop said cartridge holder with respect to said supporting element in said position for loading and unloading said cartridges, the adapter further comprising detection means configured for detecting the presence of said cartridges in said receptacles and flow control means for respective flow ports for the flow of water toward said cartridges, said detection means and said flow control means defining, for each of said receptacles, a normally-open valve which can be closed owing to the pressure of the water dispensed by said dispensing means in the absence of a respective cartridge in said receptacle.

14. The adapter according to claim 13, wherein said first straight portion of said at least one guide comprises, at said first end which is adjacent to said front opening, a guiding portion which is inclined with respect to said first straight portion away from said second portion, in order to completely remove said cartridge holder from said supporting element.

15. The adapter according to claim 14, wherein said second portion comprises a second stroke limiter at said first end of said first straight portion and at said guiding portion.

16. The adapter according to claim 13, comprising two of said guides which are arranged laterally with respect to said front opening of said supporting element and two sliders which are slidably engaged in said guides.

17. The adapter according to claim 13, wherein said at least one guide comprises a third portion which branches out at a second end of said first straight portion which is opposite to said first end and extends toward said dispensing means in order to guide said cartridge holder toward said dispensing means.

18. The adapter according to claim 17, wherein said third portion extends at right angles to said first straight portion.

19. The adapter according to claim 13, further comprising means with manual activation for moving said cartridge holder with respect to said supporting element in order to move said cartridge holder and move said cartridges closer to said dispensing means.

20. The adapter according to claim 19, wherein said movement means comprise a movement ring, which is associated with said cartridge holder by means of a cam-like coupling for the relative translational motion of said cartridge holder with respect to said movement ring as a consequence of the relative rotation of said movement ring with respect to said cartridge holder.

21. The adapter according to claim 20, wherein said movement means comprise a handle which is fixed to said movement ring and is adapted to turn said movement ring with respect to said cartridge holder.

* * * * *